(12) United States Patent
Kato et al.

(10) Patent No.: US 6,605,655 B1
(45) Date of Patent: Aug. 12, 2003

(54) POLYAMIDE RESIN COMPOSITION AND PROCESS FOR PRODUCING THE SAME

(75) Inventors: Koya Kato, Nagoya (JP); Toru Nishimura, Nagoya (JP); Toru Yamanaka, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 09/509,623

(22) PCT Filed: Jul. 28, 1999

(86) PCT No.: PCT/JP99/04047

§ 371 (c)(1),
(2), (4) Date: Mar. 29, 2000

(87) PCT Pub. No.: WO00/06649

PCT Pub. Date: Feb. 10, 2000

(30) Foreign Application Priority Data

| | | |
|---|---|---|
| Jul. 30, 1998 | (JP) | 10-215376 |
| Aug. 7, 1998 | (JP) | 10-225038 |
| Aug. 7, 1998 | (JP) | 10-225039 |
| Aug. 7, 1998 | (JP) | 10-225040 |

(51) Int. Cl.$^7$ .............................................. C08G 69/00
(52) U.S. Cl. ..................... 523/203; 106/483; 106/484; 106/487; 523/212; 523/213; 523/216; 524/447; 524/449
(58) Field of Search ................................. 524/447, 449; 523/203, 212, 213, 216; 106/483, 484, 487

(56) References Cited

U.S. PATENT DOCUMENTS

| | | | | |
|---|---|---|---|---|
| 5,830,528 A | * | 11/1998 | Beall et al. | 427/220 |
| 6,103,805 A | * | 8/2000 | Kojima et al. | 524/442 |
| 6,242,500 B1 | * | 6/2001 | Lan et al. | 516/101 |
| 6,255,378 B1 | * | 7/2001 | Fujimoto et al. | 524/449 |
| 6,284,830 B1 | * | 9/2001 | Gottschalk et al. | 524/449 |

* cited by examiner

*Primary Examiner*—Ana Woodward
(74) *Attorney, Agent, or Firm*—Piper Rudnick LLP

(57) ABSTRACT

Provided is a polyamide resin composition comprising a melt blend of (A) a polyamide resin, (B) a phyllosilicate, and (C) an olefin compound having a carboxylic acid anhydride group in the molecule or a polymer of the olefin compound, in which the phyllosilicate (B) has a reactive functional group bonded thereto and is such that the exchangeable metal ions existing in the inter layers are ion-exchanged with organic onium ions. The composition has a reduced inorganic ash content and has both high stiffness and high ductility. Optionally, the composition contains an inorganic filler apart from the phyllosilicate, an impact modifier, and a flame retardant, still having high stiffness and high ductility.

7 Claims, No Drawings

POLYAMIDE RESIN COMPOSITION AND PROCESS FOR PRODUCING THE SAME

TECHNICAL FIELD

The present invention relates to a polyamide resin composition having a low specific gravity and having high-level stiffness and ductility, and to a method for producing it.

BACKGROUND ART

Recently, in the art, finely dispersing a phyllosilicate in polyamide on the order of nanometers has been tried for enhancing the mechanical strength of the resin composition. The clay-polyamide composite could have much increased stiffness, but is problematic in that its impact strength and tensile elongation are poor as the clay layer-to-polyamide adhesiveness is low in the interface of the two. To improve the tenacity of the clay-polyamide composite, adding an elastomer to the composite is tried in Japanese Patent Laid-Open Nos. 29457/1990 and 12883/1996. Adding an elastomer thereto could improve the tensile elongation and the impact resistance of the clay-polyamide composite, but is still problematic in that it lowers the stiffness of the resulting composite as compared with that of the original composite not containing an elastomer. In Japanese Patent Laid-Open No. 331092/1995, tried is organizing a phyllosilicate, which has a functional group capable of reacting with a matrix resin, with an organic onium salt, followed by adding the thus organically modified phyllosilicate to a thermoplastic resin to thereby improve the stiffness and the ductility of the resin. At present, however, no one could obtain a resin material having both high-level stiffness and high-level ductility.

Given that situation, the present invention is to solve the problems with polyamide resin compositions noted above, that is, to improve both the contradictory properties, stiffness and ductility, of polyamide resin compositions.

DISCLOSURE OF THE INVENTION

The invention provides a polyamide resin composition comprising a melt blend of (A) a polyamide resin, (B) a phyllosilicate, and (C) an olefin compound having a carboxylic acid anhydride group in the molecule or a polymer of the olefin compound, in which the phyllosilicate (B) has a reactive functional group bonded thereto and is such that the exchangeable metal ions existing in the interlayers are ion-exchanged with organic onium ions, and also provides a method for producing the composition.

BEST MODES OF CARRYING OUT THE INVENTION

"Weight" as referred to herein indicates "mass".

The polyamide resin (A) for use in the invention is meant to indicate polyamide to be prepared from starting materials of essentially an amino acid, a lactam or a diamine, and a dicarboxylic acid. Specific examples of the starting materials include amino acids such as 6-aminocaproic acid, 11-aminoundecanoic acid, 12-aminododecanoic acid, para-aminomethylbenzoic acid, etc.; lactams such as ε-caprolactam, ω-laurolactam, etc.; aliphatic, alicyclic or aromatic diamines such as tetramethylenediamine, hexamethylenediamine, 2-methylpentamethylenediamine, undecamethylenediamine, dodecamethylenediamine, 2,2,4-/2,4,4-trimethylhexamethylenediamine, 5-methylnonamethylenediamine, metaxylylenediamine, paraxylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, etc.; aliphatic, alicyclic or aromatic dicarboxylic acids such as adipic acid, suberic acid, azelaic acid, sebacic acid, dodecane-diacid, terephthalic acid, isophthalic acid, 2-chloroterephthalic acid, 2-methylterephthalic acid, 5-methylisophthalic acid, 5-sodium-sulfoisophthalic acid, hexahydroterephthalic acid, hexahydroisophthalic acid, etc. In the invention, nylon homopolymers or copolymers to be derived from those starting materials are used either singly or as their mixtures.

Specific examples of polyamide resins especially useful in the invention are polycapramide (nylon 6), polyundecanamide (nylon 11), polylauramide (nylon 12), polyhexamethylenadipamide (nylon 66), polytetramethylenadipamide (nylon 46), polyhexamethylenesebacamide (nylon 610), polyhexamethylenedodecamide (nylon 612), polyhexamethyleneterephthalamide/polycapramide copolymer (nylon 6T/6), polyhexamethyleneterephthalamide/polydodecanamide copolymer (nylon 6T/12), polyhexamethylenadipamide/polyhexamethyleneterephthalamide copolymer (nylon 66/6T), polyhexamethylenadipamide/polyhexamethylenisophthalamide copolymer (nylon 66/6I), polyhexamethylenadipamide/polyhexamethylenisophthalamide/-polycapramide copolymer (nylon 66/6I/6), polyhexamethylenadipamide/polyhexamethyleneterephthalamide/polyhexamethylenisophthalamide copolymer (nylon 66/6T/6I), polyhexamethyleneterephthalamide/-polyhexamethylenisophtha lamide copolymer (nylon 6T/6I), polyhexamethyleneterephthalamide/poly(2-methylpentamethyle ne)terephthalamide copolymer (nylon 6T/M5T), polyhexamethyleneterephthalamide/-polyhexamethylenesebacam ide/polycapramide copolymer (nylon 6T/610/6), polyhexamethyleneterephthalamide/polydodecanamide/-polyhexamethylenadipamide copolymer (nylon 6T/12/66), polyhexamethyleneterephthalamide/polydodecanamide/-polyhexamethylenisophthalamide copolymer (nylon 6T/12/6I), polyxylylenadipamide (nylon XD6), as well as their mixtures and copolymers, etc.

Especially preferred are nylon 6, nylon 66, nylon 610, nylon 6/66 copolymer, nylon 6/12 copolymer, nylon 66/6I/6 copolymer, as well as copolymers having hexamethyleneterephthalamide units, such as nylon 6T/66 copolymer, nylon 6T/6I copolymer, nylon 6T/6 copolymer, nylon 6T/12 copolymer, nylon 6T/12/66 copolymer, nylon 6T/12/6I copolymer, etc. Practically, it is often preferable to use these polyamide resins in the form of their mixtures, depending on the desired characteristics such as moldability, heat resistance, tenacity, surface smoothness and other properties of the resins.

The degree of polymerization of the polyamide resin for use in the invention is not specifically defined. Preferably, however, the relative viscosity of the resin, as measured in a solution of concentrated sulfuric acid to have a resin concentration of 1%, at 25° C., may fall between 1.5 and 5.0, more preferably between 2.0 and 4.0.

The component (B), phyllosilicate for use in the invention is typically a layered phyllosilicate comprising layers of magnesium silicate or aluminium silicate. In this, each layer is a 2:1 tabular crystal layer with, for example, one tetrahedral silicate sheet being sandwiched by a pair of octahedral sheets containing an element selected from aluminium, magnesium, lithium and the like, in which the interlayers in each tabular crystal layer contain exchangeable cations. In general, this is so constructed that a plurality of tabular layers each having a width of from 0.05 to 0.5 μm and a thickness of from 6 to 15 angstroms are layered in order. Its cation exchange capacity generally falls between 0.2 and 3 meq/g, but preferably between 0.8 and 1.5 meq/g.

Specific examples of phyllosilicates usable herein are the family of smectites (e.g., montmorillonite, beidellite, saponite, hectorite, sauconite); the family of vermiculites (e.g., vermiculite); the family of micas (e.g., muscovite, paragonite, phlogopite, biotite, lepidolite); the family of clintonites (e.g., margarite, clintonite, anandite); the family of chlorites (e.g., donbassite, sudoite, cookeite, clinochlore, chamosite, nimite). These phyllosilicates may be natural ones, synthetic ones and even modified ones. Specific examples of synthetic phyllosilicates are swellable fluoromicas such as Li/fluorotaeniolite, Na/fluorotaeniolite, Na/tetrasilicofluoromica, Li/tetrasilicofluoromica, etc. Of those preferred are montmorillonite and Na-type tetrasilicofluoromica; and more preferred is montmorillonite.

The phyllosilicates for use in the invention have a reactive functional group bonded thereto, and in these, the exchangeable metal ions existing in the interlayers are ion-exchanged with organic onium ions. The phyllosilicates having a reactive function group bonded thereto are such that a compound having a reactive functional group is chemically bonded to the phyllosilicates via covalent bonding, ionic bonding or the like.

The method for bonding a reactive functional group to the phyllosilicates for use herein is not specifically defined, but preferably employed is a method of ion-exchanging phyllosilicates with reactive functional group-having, organic onium ions, a method of processing phyllosilicates with a reactive functional group-having coupling agent, or the like.

The reactive functional group as referred to herein is meant to indicate a functional group capable of bonding to a different functional group through chemical reaction, and includes, for example, carbon-carbon unsaturated groups such as vinyl groups, allyl groups and the like, and also carboxyl groups, hydroxyl groups, amino groups, epoxy groups, etc. Of the functional groups, preferred are those capable of reacting with the component (C), an olef in compound having a carboxylic acid anhydride group in the molecule or a polymer of the olefin compound. Concretely, preferred are carbon-carbon unsaturated groups, hydroxyl groups, amino groups, epoxy groups, etc.; and most preferred are carbon-carbon unsaturated groups.

Organic onium ions which are for ion-exchanging the exchangeable metal ions that exist in the interlayers of the phyllosilicates for use in the invention include ammonium ions, phosphonium ions, sulfonium ions, etc. Of those, preferred are ammonium ions and phosphonium ions; and more preferred are ammonium ions.

The ammonium ions may be any of primary ammonium ions, secondary ammonium ions, tertiary ammonium ions, quaternary ammonium ions, etc.

The primary ammonium ions include ions of decylammonium, dodecylammonium, octadecylammonium, oleylammonium, benzylammonium, etc.

The secondary ammonium ions include ions of methyldodecylammonium, methyloctadecylammonium, allylcyclohexylammonium, diallylammonium, etc.

The tertiary ammonium ions include ions of dimethyldodecylammonium, dimethyloctadecylammonium, triallylammonium, etc.

The quaternary ammonium ions include benzyltrialkylammonium ions such as ions of benzyltrimetylammonium, benzyltriethylammonium, benzyltributylammonium, benzyldimethyldodecylammonium, benzyldimethyloctadecylammonium, etc.; alkyltrimethylammonium ions, trimethyloctylammonium, trimethyldodecylammonium, trimethyloctadecylammonium, etc.; dimethyldialkylammonium ions such as ions of dimethyldioctylammonium, dimethyldidodecylammonium, dimethyldioctadecylammonium, etc.; as well as ions of diallyldimethylammonium, etc. trialkylmethylammonium ions such as ions of trioctylmethylammonium, etc.

Apart from those, also usable herein are ammonium ions to be derived from aniline, p-phenylenediamine, α-naphthylamine, p-aminodimethylaniline, benzidine, pyridine, piperidine, 6-aminocaproic acid, 11-aminoundecanoic acid, 12-aminododecanoic acid, 3-amino-1-propanol vinyl ether, 2-(diethylamino)ethanol vinyl ether, ethanolamine derivatives, diethanolamine derivatives, etc.; as well as their ethyleneoxide adducts, etc.

Of the ammonium ions mentioned above, preferred are ions of trioctylmethylammonium, benzyldimethyldodecylammonium, benzyldimethyloctadecylammonium, trimethyloctadecylammonium, etc.

Of those, oleylammonium, diallyldimethylammonium and the like are usable for the compounds of reactive functional group-having, organic onium ions.

One or more of these onium ions may be used herein either singly or as combined.

For ion-exchanging phyllosilicates with those organic onium ions, employable is any of a method of ion-exchanging them therewith in a polar solvent such as water, methanol, ethanol or the like; or a method of directly reacting phyllosilicates with a liquid or molten ammonium salt.

In the invention, the amount of the organic onium ions to be in the phyllosilicate may be generally such that the organic onium ions are within the range between 0.4 and 2.0 equivalents, but preferably between 0.8 and 1.2 equivalents relative to the cation exchange capacity of the phyllosilicate, in view of the dispersibility of the phyllosilicate and the thermal stability thereof in melt, and for preventing gases and smelling substances from being formed during molding the resin composition.

Another method of bonding a reactive function group to phyllosilicates comprises processing a phyllosilicate with a reactive functional group-having coupling agent. The coupling agent includes isocyanate compounds, organic silane compounds, organic titanate compounds, organic borane compounds, epoxy compounds, etc.

As the coupling agent, preferred are organic silane compounds (silane coupling agents), and their specific examples include epoxy group-having alkoxysilane compounds such as γ-glycidoxypropyltrimethoxysilane, γ-glycidoxypropyltriethoxysilane, β-(3,4-epoxycyclohexyl) ethyltrimethoxysilane, etc.; mercapto group-having alkoxysilane compounds such as γ-mercaptopropyltrimethoxysilane, γ-mercaptopropyltriethoxysilane, etc.; ureido group-having alkoxysilane compounds such as γ-ureidopropyltriethoxysilane, γ-ureidopropyltrimethoxysilane, γ-(2-ureidoethyl) aminopropyltrimethoxysilane, etc.; isocyanato group-having alkoxysilane compounds such as γ-isocyanatopropyltriethoxysilane, γ-isocyanatopropyltrimethoxysilane, γ-isocyanatopropylmethyldimethoxysilane, γ-isocyanatopropylmethyldiethoxysilane, γ-isocyanatopropylethyldimethoxysilane, γ-isocyanatopropylethyldiethoxysilane, etc.; amino group-having alkoxysilane compounds such as γ-(2-aminoethyl)aminopropylmethyldimethoxysilane, γ-(2-aminoethyl)aminopropyltrimethoxysilane, γ-aminopropyltrimethoxysilane, etc.; hydroxyl group-having alkoxysilane compounds such as γ-hydroxypropyltrimethoxysilane, γ-hydroxypropyltriethoxysilane, etc.; carbon-carbon unsaturated group-having alkoxysilane compounds such as γ-methacryloxypropyltrimethoxysilane, vinyltrimethoxysilane, N-β-(N-vinylbenzylaminoethyl)-γ-aminopropyltrimethoxysilane hydrochloride, etc. Especially preferred are carbon-carbon unsaturated bond-having alkoxysilane compounds. One or more of these silane coupling agents may be used herein either singly or as combined.

For processing phyllosilicates with any of these silane coupling agents, employable is any of a method of processing a phyllosilicate with a silane coupling agent in a polar solvent of water, methanol, ethanol or the like or in a mixed solvent thereof to thereby make the phyllosilicate adsorb the agent; a method of putting a phyllosilicate in a high-speed stirring mixer such as a Henschel mixer or the like, followed by dropwise adding thereto a silane coupling agent or its aqueous solution containing an organic solvent, with stirring, thereby to make the phyllosilicate adsorb the agent; or a method of directly adding a silane coupling agent to a phyllosilicate followed by mixing them in a mortar or the like to thereby make the phyllosilicate adsorb the agent. While phyllosilicates are processed with a silane coupling agent, it is desirable to add water, acidic water, alkaline water or the like to the system so as to promote the hydrolysis of the alkoxy group in the silane coupling agent used. In this case, an organic solvent such as methanol, ethanol or the like capable of dissolving both water and the silane coupling agent therein may be added to the system for increasing the reactivity of the silane coupling agent. Further heating the phyllosilicates thus having been processed with a silane coupling agent is possible for promoting the reaction. Without previously processing phyllosilicates with a coupling agent, optionally employable is an integral blend method of adding a coupling agent to the melt-kneading system of a phyllosilicate and a polyamide resin.

In the invention, the amount of the coupling agent relative to the phyllosilicate may generally fall between 0.01 and 20 parts by weight relative to 100 parts by weight of the phyllosilicate, but preferably between 0.05 and 15 parts by weight for further improving the ductility and the fluidity of the resin composition.

In the invention, the order of the step of processing phyllosilicates for the component (B) with organic onium ions for ion exchange and the step of processing them with a reactive functional group-having coupling agent is not specifically defined. For example, both an organic onium ion compound and a reactive functional group-having coupling agent may be added to phyllosilicates all at a time to simultaneously process them. However, method preferred is a method comprising processing phyllosilicates first with an organic onium ion compound for inclusion treatment followed by processing them with a reactive functional group-having coupling agent.

The amount of the phyllosilicate to be in the resin composition of the invention may fall between 0.1 and 40% by weight in terms of the inorganic ash content of the composition, but preferably between 1 and 20% by weight. Even more preferably, it falls between 2 and 10% by weight, in view of the balance of the tenacity and the stiffness of the composition. The inorganic ash content of the resin composition may be determined, for example, by ashing about 2 g of the composition in an electric furnace at 500° C. for 3 hours.

The resin composition contains, as the component (C), an olefin compound having a carboxylic acid anhydride group in the molecule or a polymer of the olefin compound. It includes, for example, maleic anhydride, itaconic anhydride, glutaconic anhydride, citraconic anhydride, aconitic anhydride, and also polymers of those substituted olefin compounds. The olefin compound polymers may be copolymerized with any olefins except olefin compounds having a carboxylic acid anhydride group in the molecule, for example, styrene, isobutylene, methacrylates, acrylates and the like, within the range of such comonomers not interfering with the effect of the invention, concretely, within the range thereof falling between 0.01 and 20% by weight. Preferably, however, the polymers are of substantially only olefin compounds having a carboxylic acid anhydride group in the molecule. It is desirable that the olefin compound polymers for use herein have a degree of polymerization of from 2 to 100, more preferably from 2 to 50, most preferably from 2 to 20. Of the compounds mentioned above, most preferred are maleic anhydride and polymaleic anhydride as being more effective for improving the ductility and the stiffness of the resin composition. As the polymaleic anhydride, for example, usable are those described in J. Macromol. Sci. -Revs. Macromol. Chem., C13(2), 235 (1975), etc. As the case may be, the olefin compound having a carboxylic acid anhydride group in the molecule or the polymer of the olefin compound may be previously blended in the phyllosilicate, and the resulting blend may be kneaded in melt with polyamide to give the resin composition of the invention.

The amount of the olefin compound or its polymer to be in the resin composition preferably falls between 0.05 and 10 parts by weight, relative to 100 parts by weight of the nylon resin, in view of the ductility and the fluidity of the resin composition, but more preferably between 0.1 and 5 parts by weight, even more preferably between 0.1 and 3 parts by weight.

The olefin compound having a carboxylic acid anhydride group in the molecule and its polymer for use herein shall have substantially an anhydride structure when it is kneaded in melt with a polyamide resin to give the resin composition of the invention. If desired, therefore, the olefin compound or its polymer may be hydrolyzed to be a carboxylic acid or its aqueous solution, and the resulting acid or aqueous solution may be kneaded in melt with a polyamide resin while being heated for dehydration. In that mode, the acid or its aqueous solution added could be substantially in the form of an acid anhydride in the resulting resin composition.

The resin composition of the invention may contain an inorganic filler as an additional component(D). The inorganic filler is not specifically defined, including, for example, non-fibrous inorganic fillers of tabular, rod-like, spherical substances, etc.; and also fibrous or acicular inorganic fillers, etc. The non-fibrous inorganic fillers include silicates such as wollastonite, zeolite, sericite, kaolin, mica, clay, pyrophyllite, bentonite, asbestos, talc, alumina silicate, etc.; metal compounds such as alumina, silicon oxide, magnesium oxide, zirconium oxide, titanium oxide, iron oxide, etc.; carbonates such as calcium carbonate, magnesium carbonate, dolomite, etc.; sulfates such as calcium sulfate, barium sulfate, etc.; hydroxides such as magnesium hydroxide, calcium hydroxide, aluminium hydroxide, etc.; as well as glass beads, ceramic beads, boron nitride, silicon carbide, silica, etc. These may be hollow substances. One or more of these fillers may be used either singly or as combined. Of those, especially preferred are talc, wollastonite, clay and kaolin; and most preferred is kaolin as being effective for improving the balance of the ductility and the stiffness of the resin composition. The fibrous or acicular inorganic fillers include glass fibers, carbon fibers, potassium titanate whiskers, zinc oxide whiskers, fibrous calcium carbonate, fibrous wollastonite, etc. Two or more of these fillers may be used as combined. Of those, especially preferred are glass fibers, fibrous wollastonite, and fibrous calcium carbonate.

The amount of the inorganic filler that may be in the resin composition of the invention is not specifically defined, but preferably falls between 1 and 300 parts by weight, relative to 100 parts by weight of the polyamide resin therein, more preferably between 3 and 200 parts by weight, even more preferably between 5 and 100 parts by weight. If the amount of the inorganic filler in the composition is too small, the strength of the composition will be low; but if too large, the tenacity of the composition will be poor.

Where the composition contains an inorganic filler such as kaolin, talc, glass fibers or the like, it may be dissolved in a solvent capable of dissolving polyamides, such as hexafluoroisopropanol or the like, and the resulting liquid may be filtered or centrifuged to thereby separate the inorganic filler except phyllosilicates. In that manner, the thus-separated components are separately quantified, whereby the content of the phyllosilicate and that of the inorganic filler in the composition could be determined.

The inorganic filler for use in the invention may be previously processed with any known coupling agent. The coupling agent may be selected from the compounds mentioned hereinabove as the coupling agent for phyllosilicates for the component (B) to be in the resin composition of the invention. For processing the inorganic filler, preferred are carbon-carbon unsaturated group-having alkoxysilane compounds. One ordinary but preferred method of processing inorganic fillers with such silane coupling agents comprises treating the surface of the filler with the coupling agent, and the surface-treated inorganic filler may be kneaded with a polyamide resin in melt. Without previously processing inorganic fillers with a coupling agent, optionally employable is an integral blend method of adding a coupling agent to the melt-kneading system of a filler and a polyamide resin.

The resin composition of the invention may contain an impact modifier as another additional component (E). The modifier may be a (co)polymer to be prepared by polymerizing olefinic compounds and/or conjugated dienic compounds. The olefinic compounds include α-olefins such as ethylene, etc.; vinylic compounds such as vinyl acetate, vinyl alcohols, aromatic vinyl compounds, etc.; non-conjugated dienes, α,β-unsaturated carboxylic acids, their derivatives, etc.

Preferred examples of the (co)polymer are ethylenic copolymers, conjugated dienic polymers, conjugated diene-aromatic vinylic hydrocarbon copolymers, etc. The ethylenic copolymers are meant to indicate copolymers and poly-copolymers of ethylene with other monomers. For those, monomers capable of copolymerizing with ethylene may be selected from α-olefins having at least 3 carbon atoms, non-conjugated dienes, vinyl acetate, vinyl alcohols, α,β-unsaturated carboxylic acids and their derivatives, etc.

The α-olefins having at least 3 carbon atoms include propylene, butene-1, pentene-1,3-methylpentene-1, octacene-1, etc.; and preferred are propylene and butene-1. The non-conjugated dienes include norbornene compounds such as 5-methylidene-2-norbornene, 5-ethylidene-2-norbornene, 5-vinyl-2-norbornene, 5-propenyl-2-norbornene, 5-isopropenyl-2-norbornene, 5-crotyl-2-norbornene, 5-(2-methyl-2-butenyl)-2-norbornene, 5-(2-ethyl-2-butenyl)-2-norbornene, 5-methyl-5-vinylnorbornene, etc.; and also dicyclopentadiene, methyltetrahydroindene, 4,7,8,9-tetrahydroindene, 1,5-cyclooctadiene, 1,4-hexadiene, isoprene, 6-methyl-1,5-heptadiene, 11-tridecadiene, etc. Preferred are 5-methylidene-2-norbornene, 5-ethylidene-2-norbornene, dicyclopentadiene, 1,4-hexadiene, etc. The α,β-unsaturated carboxylic acids include acrylic acid, methacrylic acid, ethacrylic acid, crotonic acid, maleic acid, fumaric acid, itaconic acid, citraconic acid, butene-dicarboxylic acid, etc. Their derivatives include alkyl esters, aryl esters, glycidyl esters, acid anhydrides, and imides.

The conjugated dienic polymers are (co)polymers derived from one or more conjugated diene monomers, including homopolymers of a single conjugated diene such as 1,3-butadiene; and copolymers of two or more conjugated dienes of, for example, 1,3-butadiene, isoprene (2-methyl-1,3-butadiene), 2,3-dimethyl-1,3-butadiene, 1,3-pentadiene. Also preferably used herein are their hydrogenated polymers to be prepared by reducing all or a part of the unsaturated bonds of the polymers through hydrogenation.

The conjugated diene-aromatic vinylic hydrocarbon copolymers are block copolymers or random copolymers to be prepared by copolymerizing conjugated dienes and aromatic vinylic hydrocarbons in different ratios. For examples of the conjugated dienes to constitute the copolymers, referred to are the monomers mentioned hereinabove, and especially preferred are 1,3-butadiene and isoprene. Examples of the aromatic vinylic hydrocarbons are styrene, α-methylstyrene, o-methylstyrene, p-methylstyrene, 1,3-dimethylstyrene, vinylnaphthalene, etc. Of those, preferred is styrene. Also preferably used herein are their hydrogenated copolymers to be prepared by reducing all or a part of the unsaturated bonds, but excepting those in the aromatic rings, of the conjugated diene-aromatic vinylic hydrocarbon copolymers through hydrogenation.

Preferably, the compounds for the impact modifier (E) have a glass transition temperature of not higher than −20° C. for ensuring higher impact strength of the resin composition. (The glass transition temperature as referred to herein is meant to indicate the peak temperature for the loss elastic modulus (E") of the compound to be determined through dynamic viscoelastometry at a frequency of 110 Hz.)

Two or more compounds noted above may be combined for the impact modifier (E).

In order to more finely disperse the particles of the impact modifier in the resin composition, preferably used, as a part or all of the impact modifier, are graft-modified or copolymerized copolymers to be prepared by grafting the (co)polymers noted above with any of various unsaturated carboxylic acids and/or their derivatives or vinyl monomers. In this case, the degree of grafting or copolymerization with any of unsaturated carboxylic acids and/or their derivatives or vinyl monomers in the grafted or copolymerized copolymers preferably falls between 0.01 and 20% by weight of the impact modifier (E) to be in the resin composition. The unsaturated carboxylic acids to be used for grafting or copolymerizing the (co)polymers include acrylic acid, methacrylic acid, ethacrylic acid, crotonic acid, maleic acid, fumaric acid, itaconic acid, citraconic acid, butenedicarboxylic acid, etc. Their derivatives include alkyl esters, glycidyl esters, di- or tri-alkoxysilyl group-having esters, acid anhydrides, imides, etc. Of those, preferred are glycidyl esters, di- or tri-alkoxysilyl group-having, unsaturated carboxylates, acid anhydrides and imides.

Preferred examples of the unsaturated carboxylic acids and their derivatives are maleic acid, fumaric acid, glycidyl acrylate, glycidyl methacrylate, diglycidyl itaconate, diglycidyl citraconate, diglycidyl ester of butene-dicarboxylic acid, monoglycidyl ester of butene-dicarboxylic acid, maleic anhydride, itaconic anhydride, citraconic anhydride, maleimide, itaconimide, citraconimide, etc.; and more preferred are glycidyl methacrylate, maleic anhydride, itaconic anhydride, and maleimide. Examples of the vinyl monomers are aromatic vinyl compounds such as styrene, etc.; vinyl cyanide compounds such as acrylonitrile, etc.; vinylsilane compounds such as vinyltrimethoxysilane, etc. Two or more of these unsaturated carboxylic acids, their derivatives or vinyl monomers may be combined for use herein. For grafting the (co)polymers with any of these unsaturated carboxylic acids, their derivatives or vinyl monomers, employable are any known methods.

In the resin composition of the invention, the amount of the impact modifier (E) may fall between 1 and 100 parts by weight, relative to 100 parts by weight of the polyamide resin therein, but preferably between 5 and 70 parts by weight for ensuring well-balanced tenacity and stiffness of the composition.

The resin composition of the invention may contain a flame retardant as still another additional component (F). As the flame retardant, preferred are halogen flame retardants containing a halogen element, especially bromine in the molecule; phosphorus compounds containing an element of phosphorus in the molecule; phosphorus-type flame retardants such as red phosphorus, etc.; and also salts to be derived from triazine compounds and cyanuric or isocyanuric acids. More preferred are halogen flame retardants. Their examples are brominated polystyrenes (including poly (dibromostyrene)), brominated polyphenylene ethers, brominated polycarbonates, brominated epoxy compounds, etc. Of the halogen flame retardants, especially preferred are those having a high molecular weight of not smaller than 1000. Two or more these flame retardants may be combined for use herein. The amount of the flame retardant that may be in the resin composition of the invention preferably falls between 0.1 and 25 parts by weight in terms of the halogen content thereof, relative to 100 parts by weight of the composition. More preferably, it falls between 0.5 and 20 parts by weight in terms of the halogen content thereof, relative to 100 parts by weight of the composition. If the halogen content thereof is too small, the resin composition could not be well resistant to flames; but if too large, it is unfavorable since the impact resistance and the tenacity of the resin composition will be poor. The halogen content of the resin composition may be determined through elementary analysis.

Phosphorus-type flame retardants are also preferred as the flame retardant (F), and they are phosphorus-containing compounds, red phosphorus, etc. Concretely, they include red phosphorus, polyammonium phosphates, aromatic phosphate compounds, aromatic bisphosphate compounds, etc. Of those, more preferred is red phosphorus. Even more preferred is red phosphorus coated with a thermosetting resin.

The amount of the phosphorus-type flame retardant that may be in the resin composition of the invention preferably falls between 0.1 and 50 parts by weight, more preferably between 0.5 and 40 parts by weight, even more preferably between 1 and 30 parts by weight, relative to 100 parts by weight of the composition. If the amount of the phosphorus-type flame retardant is too small therein, the resin composition could not be well resistant to flames; but if too large, it is unfavorable since too much phosphorus-type flame retardant will vaporize while the resin composition is melted and molded and will have some negative influences on the resin moldings, for example, to lower the heat resistance of the moldings. Red phosphorus is unstable by itself, and gradually dissolves in water or gradually reacts with water. Desirably, therefore, red phosphorus for use herein is pretreated so as to be stabilized. For pre-treating red phosphorus, various methods are employable, which are, for example, a method of not grinding red phosphorus but granulating it into fine particles without making the resulting red phosphorus particles have broken surfaces having high reactivity with water and oxygen, such as that described in Japanese Patent Laid-Open No.229806/1993; a method of adding a minor amount of aluminium hydroxide or magnesium hydroxide to red phosphorus to thereby catalytically prevent the resulting red phosphorus from oxidizing; a method of coating red phosphorus with paraffin or wax to thereby prevent the resulting red phosphorus from being contacted with water; a method of stabilizing red phosphorus by mixing it with ε-caprolactam or trioxane; a method of stabilizing red phosphorus by coating it with a thermosetting resin of phenolic resins, melamine resins, epoxy resins, unsaturated polyester resins, etc.; a method of stabilizing red phosphorus by processing it with an aqueous solution of a metal salt of copper, nickel, silver, iron, aluminium, titanium or the like so as to make a metal-phosphorus compound deposit on the surface of the red phosphorus; a method of coating red phosphorus with aluminium hydroxide, magnesium hydroxide, titanium hydroxide, zinc hydroxide or the like; a method of stabilizing red phosphorus by plating it with iron, cobalt, nickel, manganese, tin or the like in an electroless plating manner; and also combinations of these methods. Preferred are the method of not grinding red phosphorus but granulating it into fine particles without making the resulting red phosphorus particles have broken surfaces; the method of stabilizing red phosphorus by coating it with a thermosetting resin of phenolic resins, melamine resins, epoxy resins, unsaturated polyester resins, etc.; and the method of stabilizing red phosphorus by coating it with aluminium hydroxide, magnesium hydroxide, titanium hydroxide, zinc hydroxide or the like. More preferred are the method of granulating red phosphorus into fine particles without making the resulting red phosphorus particles have broken surfaces; and the method of stabilizing red phosphorus by coating it with a thermosetting resin of phenolic resins, melamine resins, epoxy resins, unsaturated polyester resins, etc. Of those thermosetting resins in the preferred method, more preferred are thermosetting phenolic resins and thermosetting epoxy resins, as the resin-coated red phosphorus could have better moisture resistance. Even more preferred is red phosphorus coated with a thermosetting phenolic resin.

Prior to being added to resin, it is desirable that red phosphorus has a mean particle size of from 0.01 to 50 $\mu$m, more preferably from 0.1 to 45 $\mu$m, from the viewpoint of the flame retardancy, the mechanical strength and the surface appearances of the resin moldings. The mean particle size of red phosphorus can be determined by the use of an ordinary laser diffractiometric, particle size distribution analyzer. The particle size distribution analyzer may be of two types, one for wet process and the other for dry process, and any of them is usable. In the wet process, water may be used as the solvent for dispersing red phosphorus therein. In this, red phosphorus to be analyzed may be previously subjected to surface treatment with alcohol or neutral detergent. As the dispersant, usable are phosphates such as sodium hexametaphosphate, sodium pyrophosphate, etc. As the dispersion unit, usable is an ultrasonic bath.

Red phosphorus for use in the invention may have an electroconductivity of generally between 0.1 and 1000 $\mu$S/cm, but preferably between 0.1 and 800 $\mu$S/cm, more preferably between 0.1 and 500 $\mu$S/cm, as measured after having been extracted in hot water, in view of the wet resistance, the mechanical strength, the tracking resistance, and the surface condition of the resin moldings containing it. (The electroconductivity of red phosphorus is measured as follows: 100 ml of pure water is added to 5 g of red phosphorus, and this is subjected to hot extraction in an autoclave or the like at 121° C. for 100 hours. Then, the resulting extract is filtered, and the filtrate is diluted to be 250 ml. The electroconductivity of the diluted extract is measured.)

The amount of phosphine to be from red phosphorus for use in the invention is generally at most 100 ppm, but preferably at most 50 ppm, more preferably at most 20 ppm, in view of the amount of gas to be from the resin composition, the stability of the composition in extrusion molding, the mechanical strength of the composition during the residence time in melt, the surface appearances of the resin moldings, and the stability of terminals so as not to be corroded by the moldings. (The amount of phosphine from red phosphorus is measured as follows: 5 g of red phosphorus is put into a container such as a test tube or the like having a capacity of 500 ml and having been purged with nitrogen. This is degassed to 10 mmHg, and heated at 280° C. for 10 minutes, and then cooled to 25° C. The gas in the test tube is diluted with nitrogen gas to be up to 760 mmHg, and analyzed with a phosphine (hydrogen phosphate) detector. The amount of phosphine from red phosphorus tested is obtained according to the following equation: Amount of phosphine (ppm)=value indicated by the detector (ppm)× degree of dilution.) Preferred commercial products of red phosphorus for use herein are Rin Kagaku Kogyo's Nova Excel 140, Nova Excel F5, etc.

Where the resin composition contains red phosphorus as the flame retardant (F), adding polyethylene terephthalate thereto is desirable, as further enhancing the flame retardancy of the composition. Polyethylene terephthalate to be used preferably has an intrinsic viscosity of from 0.25 to 3.00 dl/g, more preferably from 0.40 to 2.25 dl/g, when measured in a 1/1 mixed solvent of phenol/tetrachloroethane at 25° C. The amount of polyethylene terephthalate, if added, preferably falls between 0.1 and 50 parts by weight, more preferably between 0.1 and 30 parts by weight, relative to 100 parts by weight of the composition.

Another preferred example of the flame retardant (F) that may be in the resin composition of the invention is a salt to be derived from a triazine compound and a cyanuric or isocyanuric acid. The salt is a 1/1 (by mol) or, as the case may be, 1/2 (by mol) adduct of a cyanuric or isocyanuric acid and a triazine compound. Of triazine compounds, those not forming salts with cyanuric or isocyanuric acids shall be excluded. Triazine compounds capable of forming salts with cyanuric or isocyanuric acids and preferably usable herein include melamine, benzoguanamine, acetoguanamine, 2-amido-4,6-diamino-1,3,5-triazine, mono(hydroxymethyl)melamine, di(hydroxymethyl)melamine, and tri(hydroxymethyl)melamine. More preferred are melamine, benzoguanamine, and acetoguanamine.

Salts of triazine compounds and cyanuric or isocyanuric acids are in the form of powder to be prepared by forming a mixture of a triazine compound with a cyanuric or isocyanuric acid into an aqueous slurry, well stirring it to form the salt of the two into fine particles therein, filtering the resulting slurry, and finally drying the filtered residue, and they differ from mere mixtures of the compound and the acid. The salts for use herein do not all the time need to be completely purified, but may contain non-reacted triazine compounds or cyanuric or isocyanuric acids in some degree.

Where the resin composition of the invention contains, as the flame retardant (F), a salt of a triazine compound and a cyanuric or isocyanuric acid, the amount of the salt to be in the composition preferably falls between 0.1 and 50 parts by weight, more preferably between 0.5 and 40 parts by weight, even more preferably between 1 and 30 parts by weight, relative to 100 parts by weight of the composition.

The phosphorus-type flame-retardant noted above may be combined with a salt of a triazine compound and a cyanuric or isocyanuric acid to give the flame retardant (F) for use herein.

The flame-retardant polyamide resin composition of the invention may optionally contain a flame retardant promoter. As the flame retardant promoter, preferred are metal oxides and metal borates. Specific examples of the metal oxides are antimony trioxide, sodium antimonate, zinc oxide, ferrous oxide, ferric oxide, stannous oxide, stannic oxide, magnesium oxide, etc. Specific examples of metal borates are sodium borate, zinc borate, magnesium borate, calcium borate, manganese borate, etc. One or more of these compounds may be used either singly or as combined. The amount of the flame retardant promoter, if any, in the resin composition preferably falls between 1/100 and 1, more preferably between 1/20 and 4/5, in terms of the ratio by weight of the promoter to the flame retardant. If the ratio of the promoter to the flame retardant is too small, the resin composition could not be well resistant to flames; but if too large, it will have some negative influences on the resin composition, for example, it will lower the fluidity of the resin composition being molded in melt.

Where the composition contains inorganic particles of a flame retardant promoter such as antimony trioxide or the like, it may be dissolved in a solvent capable of dissolving polyamides, such as hexafluoroisopropanol or the like, and the resulting liquid may be filtered or centrifuged to thereby separate the inorganic particles except phyllosilicates. In that manner, the thus-separated components are separately quantified, whereby the content of the phyllosilicate and that of other inorganic particles in the composition could be determined.

The resin composition of the invention can be made to be resistant to flames, for which adding the flame retardant (F) as above is effective. As one criterion for the flame retardancy of the composition, it is desirable that the limiting oxygen index (LOI) for the composition, as measured according to the method D2863 in ASTM, is at least 24, more preferably at least 25.5, even more preferably at least 27.

The resin composition of the invention may optionally contain any known additives of, for example, nucleating agents, yellowing or discoloration inhibitors, antioxidants such as hindered phenols, hindered amines, etc., heat stabilizers, lubricants, UV inhibitors, colorants, etc.

The method for producing the polyamide resin composition of the invention comprises melting and kneading a mixture of the constituent components, (A) a polyamide resin, (B) a phyllosilicate having been ion-exchanged with organic onium ions and having a reactive functional group bonded thereto, and (C) an olefin compound having a carboxylic acid anhydride group in the molecule or its polymer. The mode of kneading the mixture is not specifically defined. For example, the mixture may be kneaded in melt by the use of any known melt-kneading machine, such as a single-screw or twin-screw extruder, a Banbury mixer, a kneader, a mixing roll, etc. Preferred is using a twin-screw extruder. For removing water and low-molecular-weight volatile substances that maybe formed while the mixture is kneaded in melt, it is desirable to make the kneading machine have vent ports. Where the resin composition is to contain optional components, (D) an inorganic filler, (E) an impact modifier and (F) a flame retardant, they may be added to the mixture of the components (A) to (C) in any stage of melting and kneading it.

The polyamide resin composition thus produced of the invention may be molded into moldings of any desired shapes in any ordinary methods of, for example, injection molding, extrusion molding, blow molding, etc. The moldings may be worked or processed into secondary products in any known methods, for example, by cutting, welding or adhering them.

EXAMPLES

The invention is described more concretely with reference to the following Examples, which, however, are not intended to restrict the scope of the invention. In the following Examples and Comparative Examples, the blend ratios are all by weight.

In the following Examples, the samples produced were evaluated for their properties according to the methods mentioned below.

Mechanical strength: Measured according to the following standard methods.
Tensile strength: ASTM D638,
Flexural modulus: ASTM D790,
Izod impact strength: ASTM D256.
Test for Flame Retardancy:
The samples were tested according to UL-94; and the limiting oxygen index (LOI) for them was measured according to ASTM D2863.

Preparation of Organically Modified Phyllosilicates

Reference Example 1

38.5 g of trioctylmethylammonium chloride was added to 80 g of montmorillonite from Yamagata, Japan (Kunimine Industry's trade name, Kunipia F, having a cation exchange capacity of 119 meq./100 g) and mixed in a mortar for 20 minutes, to which was added 8 g of γ-methacryloxypropyltrimethoxysilane (Dow Corning Toray Silicone's trade name, SZ6030) and further mixed in the mortar for 20 minutes to prepare an organically modified phyllosilicate (C-1A). The inorganic ash content of the organically modified phyllosilicate was measured, and was 65% by weight. To measure its inorganic ash content, 0.1 g of the phyllosilicate was ashed in an electric furnace at 500° C. for 3 hours. The interlayer distance in the organically modified phyllosilicate was measured by the use of a wide-angle X-ray diffractometer, and was 2.4 nm.

Reference Example 2

In the same manner and from the same starting materials in the same blend ratio as in Reference Example 1, an organically modified phyllosilicate was prepared, to which was added 2 g of an aqueous solution of 500 ppm hydrochloric acid, and mixed in a mortar for 30 minutes. The organically modified phyllosilicate thus prepared herein is referred to as C-1B. Its inorganic ash content and interlayer distance were the same as those of C-1A.

Reference Example 3

In the same manner and from the same starting materials in the same blend ratio as in Reference Example 1, an organically modified phyllosilicate was prepared, to which was added a mixture of 2 g of an aqueous solution of 500 ppm hydrochloric acid and 6 g of methanol, and mixed in a mortar for 30 minutes. The organically modified phyllosilicate thus prepared herein is referred to as C-1C. Its inorganic ash content and interlayer distance were the same as those of C-1A.

Reference Example 4

8.4 g of γ-methacryloxypropyltrimethoxysilane was added to 120 g of a synthetic mica with an interlayer trioctylmethylammonium inclusion (Corp Chemical's trade name, MTE) and mixed in a mortar for 20 minutes, to which was added a mixture of 2.1 g of an aqueous solution of 500 ppm hydrochloric acid and 6.3 g of methanol and further stirred in the mortar for 30 minutes to prepare an organic synthetic mica (C-2). Its inorganic ash content and interlayer distance were 69% by weight and 2.4 nm, respectively.

Reference Example 5

100 g of the same montmorillonite as in Reference Example 1 was dispersed in 10 liters of hot water with stirring, to which was added 2 liters of hot water with 41 g of trimethylstearylammonium chloride (equivalent to the cation exchange capacity of the montmorillonite) dissolved therein, and stirred for 1 hour. The deposit formed was taken out through filtration, and washed with hot water. The operation of washing and filtration was repeated three times. The resulting solid was then dried in vacuum at 80° C. to give an organically modified phyllosilicate. To 100 parts by weight of the organically modified phyllosilicate, added was 1 part by weight of γ-methacryloxypropyltrimethoxysilane and mixed in a mortar for 30 minutes. The organically modified phyllosilicate thus prepared herein is referred to as C-3. Its inorganic ash content and interlayer distance were 64% by weight and 2.1 nm, respectively.

Reference Example 6

An organically modified phyllosilicate (C-4) was prepared in the same manner as in Reference Example 3, except that γ-methacryloxypropyltrimethoxysilane was not added thereto. Its inorganic ash content and interlayer distance were 68% by weight and 2.4 nm, respectively.

Reference Example 7

A phyllosilicate (C-5) was prepared in the same manner with the same silane coupling treatment as in Reference Example 3, except that trioctylmethylammonium chloride was not added thereto. Its inorganic ash content and interlayer distance were 94% by weight and 1.3 nm, respectively.

Reference Example 8

An organically modified phyllosilicate (C-6) was prepared in the same manner as in Reference Example 5, except that γ-glycidoxypropyltrimethoxysilane but not γ-methacryloxypropyltrimethoxysilane was added thereto. Its inorganic ash content and interlayer distance were the same as those of C-3.

Reference Example 9

An organically modified phyllosilicate (C-7) was prepared in the same manner as in Reference Example 5, except that 36 g of oleylamine hydrochloride but not 41 g of trimethylstearylammonium chloride was added thereto. Its inorganic ash content and interlayer distance were 66% and 2.5 nm, respectively.

Silane Coupling Treatment of Kaolin

Reference Example 10

With stirring in a Henschel mixer, 1 kg of kaolin (Engelhard's trade name, Satinton 5, having a particle size of 0.8 μm) was sprayed with a mixture of 30 g of γ-methacryloxypropyltrimethoxysilane, 45 g of methanol and 25 g of an aqueous solution of 5 ppm hydrochloric acid. After having been stirred for 30minutes, the surface-processed kaolin was collected and dried in a hot air oven at 130° C. for 12 hours.

Preparation of Impact Modifier

Reference Example 11

To 100 parts by weight of an ethylene-propylene copolymer (Mitsui Petrochemical's P0680), added were 2 parts by weight of maleic anhydride and 0.7 parts by weight of 2,5-dimethyl-2,5-di-t-butylperoxyhexane (NOF Corporation's Perhexa 25B), and blended in dry. The resulting blend was kneaded in a twin-screw extruder, Ikegai Tekko's Model PCM30, at a cylinder temperature of 210° C. to prepare a maleic anhydride-modified ethylene-propylene copolymer (E-1). Its glass transition temperature was measured, and was −42° C.

Example 1

Nylon 6 resin having a relative viscosity, as measured in a concentrated sulfuric acid to have a resin concentration of 1% at 25° C., of 2.70, the organically modified phyllosilicate C-1A prepared in Reference Example 1, and maleic anhydride were blended in dry in the ratio as in Table 1. The resulting blend was all fed into the feeder of a twin-screw extruder, Ikegai Tekko's Model PCM30being driven at a cylinder temperature of 250° C. and at a screw revolution of 200 rpm, kneaded in melt, and pelletized. The pellets were molded into various test pieces through injection molding, and these were tested for the flexural modulus, the tensile strength, and the tensile elongation at break. 2 g was sampled out of the test pieces, and ashed in an electric furnace at 500° C. for 3 hours, and the inorganic ash content of the composition was determined.

Examples 2 to 7

The same process as in Example 1 was repeated, except that any of C-1B prepared in Reference Example 2, C-1C prepared in Reference Example 3, C-2 prepared in Reference Example 4, C-3 prepared in Reference Example 5, and C-7 prepared in Reference Example 9 was used as the phyllosilicate.

Comparative Examples 1 to 4, and 8

The same process as in any of Examples 1 to 4, and 7 was repeated, except that maleic anhydride was not added to the system. The data obtained are given in Table 2, from which it is seen that the tensile elongation at break of the compositions produced herein is lower than that of the compositions in Examples 1 to 4 and 7 of the invention.

Comparative Example 5

The same process as in Example 4 was repeated. In this, however, the organically modified phyllosilicate (MTE) as in Reference Example 4 but not subjected to silane coupling treatment was directly used as it was, and maleic anhydride was not added to the system. The data obtained are given in Table 2, from which it is seen that the tensile elongation at break of the composition produced herein is lower than that of the composition in Example 4 of the invention.

Comparative Example 6

The same process as in Example 3 was repeated. In this, however, the phyllosilicate C-4 prepared in Reference Example 6 but not subjected to silane coupling treatment was used. The data obtained are given in Table 2, from which it is seen that the tensile elongation at break of the composition produced herein is lower than that of the composition in Example 3 of the invention.

Comparative Example 7

The same process as in Example 1 was repeated. In this, however, the phyllosilicate C-5 prepared in Reference Example 7 was used, and the components were blended in the ratio as in Table 2. The data obtained are given in Table 2, from which it is seen that the flexural modulus and the tensile elongation at break of the composition produced herein are lower than those of the compositions in Examples 1 to 3 of the invention.

Comparative Example 9

The same process as in Comparative Example 1 was repeated, except that the phyllosilicate C-6 prepared in Reference Example 8 was used herein. The data obtained are given in Table 2, from which it is seen that the tensile elongation at break of the composition produced herein is lower than that of the compositions in Examples 1 to 3 of the invention.

Example 8

Nylon 6 resin having a relative viscosity, as measured in Example 1, of 2.75, the organically modified phyllosilicate C-1C prepared in Reference Example 3, the surface-processed kaolin prepared in Reference Example 10, and maleic anhydride were blended in dry in the ratio as in Table 3. The resulting blend was processed in the same manner as in Example 1. One g was sampled out of the test pieces produced, and this was dissolved in 20 ml of hexafluoroisopropanol, and centrifuged to separate the kaolin. The amount of the thus-separated kaolin was measured. The supernatant was concentrated, and ashed at 500° C. for 3 hours, and the inorganic ash content of the phyllosilicate used was determined.

Examples 9 to 13

The same nylon 6 as in Example 8, C-1C prepared in Reference Example 3, C-2 prepared in Reference Example 4, C-3 prepared in Reference Example 5, the same kaolin as in Example 8, talc having a mean particle size of 1.5 μm (Fuji Talc's trade name, LMS-300), chopped glass fibers having a diameter of 13 μm (Nippon Electric Glass's trade name, TN-202), and maleic anhydride were blended in dry in different ratios as in Table 3. The resulting blends were processed in the same manner as in Example 8.

Comparative Example 10

The same process as in Example 8 was repeated, except that maleic anhydride was not added to the system. The data obtained are given in Table 4, from which it is seen that the tensile elongation at break of the composition produced herein is lower than that of the compositions in Example 8 of the invention.

Comparative Example 11

The same process as in Example 8 was repeated. In this, however, the organically modified phyllosilicate C-4 prepared in Reference Example 6 but not subjected to silane coupling treatment was used. It is seen that the tensile elongation at break of the composition produced herein is lower than that of the composition in Example 8 of the invention.

Comparative Example 12

The same process as in Example 8 was repeated, except that the organically modified phyllosilicate C-5 prepared in Reference Example 7was used herein. It is seen that the flexural modulus of the composition produced herein is lower than that of the composition in Example 8 of the invention.

Comparative Example 13

The same process as in Example 8 was repeated. In this, however, the organically modified phyllosilicate was not used, and the amount of kaolin was varied as in Table 4. It is seen that the flexural modulus of the composition produced herein is lower than that of the composition in Example 8 though the two compositions have the same inorganic ash content.

Example 14

Nylon 6 resin having a relative viscosity, as measured in Example 1, of 2.75, the organically modified phyllosilicate C-1C prepared in Reference Example 3, the impact modifier E-1 prepared in Reference Example 9, and maleic anhydride were blended in dry in the ratio as in Table 5. The resulting blend was kneaded in melt in the same manner as in Example 1. After dried, this was molded intovarious test pieces through injection moldings, and these were analyzed and tested for the inorganic ash content, the tensile strength, the tensile elongation, the flexural modulus, and the Izod impact strength. The data obtained are given in Table 5.

Example 15

The same process as in Example 14 was repeated, except that the organically modified phyllosilicate C-2 prepared in Reference Example 4 was used herein and the components were formulated as in Table 5.

Examples 16, 17

The same components as in Example 14 were processed in the same manner as therein, except that their blend ratio was varied as in Table 5.

Example 18

The same nylon 6 as in Example 14, the same organically modified phyllosilicate as in Example 15, an ethylenic ionomer resin (Mitsui DuPont Chemical's Hi-Milan 1706—this is hereinafter referred to as E-2) serving as an impact modifier, and maleic anhydride were formulated as in Table 5, and the resulting blend was processed in the same manner as in Example 14.

Examples 19, 20

The same process as in Example 14 was repeated. In this, however, the organically modified phyllosilicate C-3 prepared in Reference Example 5 was used, and the components were formulated as in Table 5.

Comparative Example 14

The same process as in Example 14 was repeated, except that maleic anhydride was not added to the system. The data obtained are given in Table 6, from which it is seen that the tensile elongation at break of the composition produced herein is lower than that of the composition in Example 14 of the invention.

Comparative Example 15

The same process as in Example 14 was repeated. In this, however, the organically modified phyllosilicate C-4 prepared in Reference Example 6 but not subjected to silane coupling treatment was used. It is seen that the tensile elongation at break of the composition produced herein is lower than that of the composition in Example 14 of the invention.

Comparative Example 16

The same process as in Example 14 was repeated. In this, however, the organically modified phyllosilicate C-4 prepared in Reference Example 7 was used. It is seen that the flexural modulus of the composition produced herein is lower than that of the composition in Example 14 of the invention.

Comparative Example 17

The same process as in Example 14 was repeated, except that the organically modified phyllosilicate was not used herein. The data obtained are given in Table 6, from which it is seen that the flexural modulus of the composition produced herein is lower than that of the composition in Example 14 of the invention.

Example 21

To 100 parts by weight of nylon 6 resin having a relative viscosity, as measured in Example 1, of 2.75, added were 7.7 parts by weight of the organically modified phyllosilicate C-1C prepared in Reference Example 3 (this corresponds to 5 parts by weight in terms of its inorganic ash content), 37.0 parts by weight of a brominated polyphenylene ether (Great Lakes' trade name, PO-64P), 9.2 parts by weight of antimony trioxide (having a mean particle size of 1.2 μm), and 0.3 parts by weight of maleic anhydride, and blended in dry. The resulting blend was all fed into the feeder of a twin-screw extruder (Ikegai Tekko's PCM-30) being driven at a cylinder temperature of 260° C. and at a screw revolution of 200 rpm, kneaded in melt, and extruded out, and the thus-extruded strands were cooled and then pelletized with a pelletizer. After dried, the pellets were molded into various test pieces through injection molding, and these were tested for the tensile strength, the tensile elongation, the flexural modulus, the Izod impact strength, and the flame retardancy. One g was sampled out of the test pieces, dissolved in 20 ml of hexafluoroisopropanol, and centrifuged to separate the deposit, antimony trioxide. The supernatant was concentrated, and ashed at 500° C. for 3 hours, and the inorganic ash content of the phyllosilicate used was determined.

The data obtained are given in Table 7.

Example 22

The same process as in Example 21 was repeated. In this, however, a brominated polystyrene (Nissan Ferro-organic Chemical's trade name, Pyrocheck 68PB) was used as the flame retardant, and the components were formulated as in Table 7.

Example 23

The same process as in Example 21 was repeated. In this, however, the same nylon 6 as in Example 21, the organically modified phyllosilicate C-2 prepared in Reference Example 4, the same brominated polystyrene as in Example 22, and maleic anhydride were formulated as in Table 7.

Example 24

The same components as in Example 21 were processed in the same manner as therein, except that their blend ratio was varied as in Table 7.

Example 25

The same process as in Example 21 was repeated. In this, however, red phosphorus (Rin Kagaku Kogyo's trade name, Nova Excel 140) was used as the flame retardant, and the components were formulated as in Table 7.

Comparative Example 18

The same process as in Example 21 was repeated, except that maleic anhydride was not used herein. The data obtained are given in Table 8, from which it is seen that the tensile elongation at break and the impact strength of the composition produced herein are lower than those of the composition in Example 21 of the invention.

Comparative Example 19

The same process as in Example 21 was repeated, except that the organically modified phyllosilicate C-5 prepared in Reference Example 7was used herein. It is seen that the tensile elongation at break and the flexural modulus of the composition produced herein are lower than those of the composition in Example 21 of the invention.

Comparative Example 20

The same process as in Example 23 was repeated, except that maleic anhydride was not used herein. The data obtained are given in Table 8, from which it is seen that the tensile elongation at break of the composition produced herein is lower than that of the composition in Example 23 of the invention.

TABLE 1

|  |  | Ex. 1 | Ex. 2 | Ex. 3 | Ex. 4 | Ex. 5 | Ex. 6 | Ex. 7 |
|---|---|---|---|---|---|---|---|---|
| Nylon 6 | wt.pts. | 94.6 | 94.6 | 94.6 | 94.9 | 96.9 | 95.3 | 94.7 |
| Phyllosilicate | wt.pts. | C-1A | C-1B | C-1C | C-2 | C-3 | C-3 | C-7 |
|  |  | 5.4 | 5.4 | 5.4 | 5.1 | 3.1 | 4.7 | 5.3 |
| Maleic Anhydride | wt.pts. | 0.34 | 0.34 | 0.34 | 0.34 | 0.34 | 0.34 | 0.34 |
| Inorganic Ash Content | % | 3.5 | 3.6 | 3.3 | 3.5 | 2.0 | 3.0 | 3.5 |
| Tensile Strength | MPa | 94 | 94 | 94 | 96 | 91 | 92 | 92 |
| Tensile Elongation at Break | % | 23 | 54 | 91 | 22 | 150 | 85 | 33 |
| Flexural Modulus | GPa | 3.9 | 3.7 | 3.7 | 4.2 | 3.5 | 3.8 | 4.0 |

TABLE 2

|  |  | Co.Ex. 1 | Co.Ex. 2 | Co.Ex. 3 | Co.Ex. 4 | Co.Ex. 5 | Co.Ex. 6 | Co.Ex. 7 | Co.Ex. 8 | Co.Ex. 9 |
|---|---|---|---|---|---|---|---|---|---|---|
| Nylon 6 | wt.pts. | 94.6 | 94.6 | 94.6 | 94.9 | 95.0 | 94.9 | 96.3 | 94.7 | 96.3 |
| Phyllosilicate | wt.pts. | C-1A | C-1B | C-1C | C-2 | MTE | C-4 | C-5 | C-7 | C-6 |
|  |  | 5.4 | 5.4 | 5.4 | 5.1 | 5.0 | 5.1 | 3.7 | 5.3 | 5.5 |
| Maleic Anhydride | wt.pts. | — | — | — | — | — | 0.34 | 0.34 | — | — |
| Inorganic Ash Content | % | 3.4 | 3.6 | 3.7 | 3.5 | 3.4 | 3.5 | 3.5 | 3.5 | 3.5 |
| Tensile Strength | MPa | 93 | 92 | 91 | 94 | 95 | 92 | 85 | 85 | 89 |
| Tensile Elongation at Break | % | 4 | 4 | 4 | 5 | 5 | 4 | 5 | 3 | 3 |
| Flexural Modulus | GPa | 3.8 | 3.8 | 3.8 | 3.9 | 4 | 3.9 | 3.0 | 3.9 | 3.8 |

TABLE 3

|  |  | Ex. 8 | Ex. 9 | Ex. 10 | Ex. 11 | Ex. 12 | Ex. 13 |
|---|---|---|---|---|---|---|---|
| Nylon 6 | wt.pts. | 77.3 | 77.3 | 65.7 | 62.8 | 80.3 | 75.3 |
| Phyllosilicate | wt.pts. | C-1C | C-1C | C-2 | C-2 | C-3 | C-3 |
|  |  | 7.7 | 7.7 | 4.3 | 7.2 | 4.7 | 4.7 |
| Inorganic Filler | wt.pts. | kaolin | talc | kaolin | GF | talc | talc |
|  |  | 15 | 15 | 30 | 30 | 15 | 20 |
| Maleic Anhydride | wt.pts. | 0.3 | 0.3 | 0.2 | 0.3 | 0.3 | 0.3 |
| Inorganic Ash Content of Phyllosilicate | wt. % | 5.0 | 5.0 | 2.9 | 4.9 | 3.0 | 3.0 |
| Total Inorganic Ash Content | wt. % | 20 | 20 | 33 | 35 | 18 | 23 |
| Specific Gravity |  | 1.26 | 1.26 | 1.38 | 1.41 | 1.26 | 1.30 |
| Tensile Strength | MPa | 89 | 91 | 86 | 168 | 94 | 95 |
| Tensile Elongation | % | 20 | 9 | 11 | 7 | 12 | 12 |
| Flexural Modulus | GPa | 5.7 | 6.2 | 5.5 | 8.5 | 5.9 | 6.6 |

TABLE 4

|  |  | Co. Ex.10 | Co. Ex.11 | Co. Ex.12 | Co. Ex.13 |
|---|---|---|---|---|---|
| Nylon 6 | wt.pts. | 77.3 | 77.6 | 79.7 | 80.0 |
| Phyllosilicate | wt.pts. | C-1C | C-4 | C-5 | — |
|  |  | 7.7 | 7.4 | 5.3 | — |
| Inorganic Filler | wt.pts. | kaolin | kaolin | kaolin | kaolin |
|  |  | 15 | 15 | 15 | 20 |
| Maleic Anhydride | wt.pts. | — | 0.3 | 0.3 | 0.3 |
| Inorganic Ash Content of Phyllosilicate | wt. % | 5.0 | 5.0 | 4.9 | 0 |
| Total Inorganic Ash Content | wt. % | 20 | 20 | 20 | 20 |
| Specific Gravity |  | 1.26 | 1.26 | 1.26 | 1.27 |
| Tensile Strength | MPa | 86 | 86 | 84 | 88 |
| Tensile Elongation | % | 4 | 3 | 48 | 60 |
| Flexural Modulus | GPa | 5.3 | 5.4 | 4.0 | 4.2 |

TABLE 5

|  |  | Ex. 14 | Ex. 15 | Ex. 16 | Ex. 17 | Ex. 18 | Ex. 19 | Ex. 20 |
|---|---|---|---|---|---|---|---|---|
| Nylon 6 | wt.pts. | 72.4 | 72.9 | 85.0 | 90.0 | 80.7 | 77.7 | 75.3 |
| Phyllosilicate | wt.pts. | C-1C | C-2 | C-1C | C-1C | C-2 | C-3 | C-3 |
|  |  | 7.6 | 7.1 | 5.0 | 5.0 | 4.3 | 2.3 | 4.7 |
| Impact modifier | wt.pts. | E-1 | E-1 | E-1 | E-1 | E-2 | E-1 | E-1 |
|  |  | 20 | 20 | 10 | 5 | 15 | 20 | 20 |
| Maleic Anhydride | wt.pts. | 0.3 | 0.3 | 0.3 | 0.3 | 0.3 | 0.3 | 0.3 |
| Inorganic Ash Content | % | 5.1 | 4.8 | 3.5 | 3.4 | 3.0 | 1.5 | 3.0 |
| Tensile Strength | MPa | 53 | 55 | 74 | 81 | 53 | 52 | 52 |
| Tensile Elongation | % | 118 | 90 | 72 | 56 | 200 | 95 | 80 |
| Flexural Modulus | GPa | 2.6 | 2.8 | 3.1 | 3.6 | 2.9 | 2.3 | 2.5 |
| Izod Impact Strength | J/m | 730 | 700 | 205 | 170 | 210 | 750 | 750 |

TABLE 6

|  |  | Co.Ex.14 | Co. Ex.15 | Co. Ex.16 | Co.Ex.17 |
|---|---|---|---|---|---|
| Nylon 6 | wt.pts. | 72.4 | 72.6 | 74.7 | 80.0 |
| Phyllosilicate | wt.pts. | C-1C | C-4 | C-5 | — |
|  |  | 7.6 | 7.4 | 5.3 | — |
| Impact modifier | wt.pts. | E-1 | E-1 | E-1 | E-1 |
|  |  | 20 | 20 | 20 | 20 |
| Maleic Anhydride | wt.pts. | — | 0.3 | 0.3 | 0.3 |
| Inorganic Ash Content | % | 4.9 | 4.9 | 5.0 | 0 |
| Tensile Strength | MPa | 54 | 55 | 51 | 51 |
| Tensile Elongation | % | 21 | 8 | 180 | 200 |
| Flexural Modulus | GPa | 2.7 | 2.5 | 1.9 | 1.8 |
| Izod Impact Strength | J/m | 630 | 620 | 580 | 750 |

TABLE 7

|  |  | Ex. 21 | Ex. 22 | Ex. 23 | Ex. 24 | Ex. 25 |
|---|---|---|---|---|---|---|
| Nylon 6 | wt.pts. | 100 | 100 | 100 | 100 | 100 |
| Phyllosilicate | wt.pts. | C-1C | C-1C | C-2 | C-1C | C-3 |
|  |  | 7.7 | 7.7 | 4.0 | 5.1 | 6.2 |
| Flame Retardant | wt.pts. | Br-PPO | Br-PS | Br-PS | Br-PPO | red phosphorus |
|  |  | 37.0 | 26.8 | 18.5 | 8.4 | 5.0 |
| Antimony Trioxide | wt.pts. | 9.2 | 7.0 | — | 3.3 | — |
| Maleic Anhydride | wt.pts. | 0.3 | 0.3 | 0.3 | 0.3 | 0.3 |
| Inorganic Ash Content of Phyllosilicate | wt. % | 3.2 | 3.4 | 2.3 | 2.8 | 3.6 |
| Tensile Strength | MPa | 97 | 93 | 91 | 91 | 89 |
| Tensile Elongation | % | 13 | 17 | 58 | 33 | 35 |

TABLE 7-continued

|  |  | Ex. 21 | Ex. 22 | Ex. 23 | Ex. 24 | Ex. 25 |
|---|---|---|---|---|---|---|
| Flexural Modulus | GPa | 4.7 | 4.6 | 3.8 | 4.1 | 4.1 |
| Izod Impact Strength | J/m | 60 | 62 | 65 | 61 | 65 |
| Flame Retardancy (UL94) |  | V-0 | V-0 | V-2 | V-2 | V-2 |
| Flame Retardancy (LOI) |  | 32 | 31 | 29 | 30 | 28 |

TABLE 8

|  |  | Co.Ex.18 | Co.Ex.19 | Co.Ex.20 |
|---|---|---|---|---|
| Nylon 6 | wt.pts. | 100 | 100 | 100 |
| Phyllosilicate | wt.pts. | C-1C | C-5 | C-2 |
|  |  | 7.7 | 5.3 | 4.0 |
| Flame Retardant | wt.pts. | Br-PPO | Br-PPO | Br-PS |
|  |  | 37.0 | 37.0 | 18.5 |
| Antimony Trioxide | wt.pts. | 9.2 | 9.0 | — |
| Maleic Anhydride | wt.pts. | — | 0.3 | — |
| Inorganic Ash Content of Phyllosilicate | wt. % | 3.2 | 3.3 | 2.3 |
| Tensile Strength | MPa | 95 | 88 | 91 |
| Tensile Elongation | % | 3 | 8 | 5 |
| Flexural Modulus | GPa | 4.7 | 3.2 | 3.8 |
| Izod Impact Strength | J/m | 35 | 45 | 40 |
| Flame Retardancy (UL94) |  | V-0 | V-0 | V-2 |
| Flame Retardancy (LOI) |  | 33 | 32 | 29 |

INDUSTRIAL APPLICABILITY

As having the advantages of low specific gravity, high stiffness, high tenacity, high impact resistance and high flame retardancy, the polyamide resin composition of the invention is applicable to moldings, sheets, tubes, films, wrapping materials and others for machine parts such as car parts, etc., as well as for electric and electronic members, construction materials, furniture, miscellaneous goods, etc.

What is claimed is:

1. A polyamide resin composition consisting essentially of a melt blend of (A) a polyamide resin, (B) a phyllosilicate having carbon-carbon unsaturated group, bonded thereto, said phyllosilicate is such that the exchangeable metal ions existing in the interlayers are ion-exchanged with organic onium ions, and wherein the amount of the phyllosilicate is from 0.1 to 40% by weight in terms of the inorganic ash content of said composition, and (c) an olefin compound having a carboxylic acid anhydride group in the molecule or a polymer of the olefin compound, wherein the olefin compound having a carboxylic acid anhydride group in the molecule (C) is at least one selected from maleic anhydride, itaconic anhydride, glutaconic anhydride, citraconic anhydride, and aconitic anhydride.

2. The polyamide resin composition as claimed in claim 1, wherein a part or all of the organic onium ions include the carbon-carbon unsaturated group.

3. The polyamide resin composition as claimed in claim 1, wherein the carbon-carbon unsaturated group is included in a coupling agent binding the carbon-carbon unsaturated group to the phyllosilicate.

4. The polyamide resin composition as claimed in claim 3, wherein the coupling agent comprises an alkoxysilane compound.

5. The polyamide resin composition as claimed in any of claims 1 to 4, wherein the amount of the olefin compound having a carboxylic acid anhydride group in the molecule or its polymer (C) is from 0.05 to 10 parts by weight relative to 100 parts by weight of the polyamide resin (A).

6. The polyamide resin composition according to claim 1, wherein said polyamide resin (A) is selected from the group consisting of: polycapramide (nylon 6), polyundecanamide (nylon 11), polylauramide (nylon 12), polyhexamethylenadipamide (nylon 66), polytetramethylenadipamide (nylon 46), polyhexamethylenesebacamide (nylon 610), polyhexamethylenedodecamide (nylon 612), polyhexamethylene-terephthalamide/polycapramide copolymer (nylon 6T/6), polyhexamethylene-terephthalamide/polydodecanamide copolymer (nylon 6T/12), polyhexa-methylenadipamide/polyhexamethyleneterephthalamide copolymer (nylon 66/6T), polyhexamethylenadipamide/polyhexamethylenisophthalamide copolymer (nylon 66/6I), polyhexamethylenadipamide/polyhexamethylenisophthalamide/polycapramide copolymer (nylon 66/6I/6), polyhexamethylenadipamide/polyhexamethyleneterephthalamide/polyhexamethylenisophtihalamide copolymer (nylon 66/6T/6I), polyhexamethylene-terephthalamide/polyhexamethylenisophthalamide copolymer (nylon 6T/6I), polyhexamethyleneterephthalamide/poly(2-methylpentamethylene) terephthalamide copolymer (nylon 6T/M5T), polyhexamethyleneterephthalamide/polyhexamethylenese-bacamide/polycapramide copolymer (nylon 6T/6 10/6), polyhexamethylene-terephthalamide/polydodecanamide/-polyhexamethylenadipamide copolymer (nylon 6T/12/66), polyhexamethyleneterephthalamide/polydodecanamide/polyhexa-methylenisophthalamide copolymer (nylon 6T/12/6I), polyxylylenadipamide (nylon XD6), as well as their mixtures and copolymers.

7. A method for producing a polyamide resin composition, which comprises the steps of melting and kneading (A) a polyamide resin, (B) a phyllosilicate which has a carbon-carbon unsaturated group bonded thereto and in which the exchangeable metal ions existing in the interlayers have been previously ion-exchanged with organic onium ions, (C) an olefin compound having a carboxylic acid anhydride group in the molecule or a polymer of the olefin compound, wherein the olefin compound having a carboxylic acid anhydride group in the molecule (C) is at least one selected from maleic anhydride, itaconic anhydride, glutaconic anhydride, citraconic anhydride, and aconitic anhydride, and optionally (D) an inorganic filler, (E) an impact modifier, and (F) a flame retardant.

* * * * *

UNITED STATES PATENT AND TRADEMARK OFFICE
CERTIFICATE OF CORRECTION

PATENT NO. : 6,605,655 B1
DATED : August 12, 2003
INVENTOR(S) : Kato et al.

It is certified that error appears in the above-identified patent and that said Letters Patent is hereby corrected as shown below:

<u>Column 18,</u>
Line 37, Comparative Example 16, please change "C-4" to -- C-5 --.

Signed and Sealed this

Eighteenth Day of November, 2003

JAMES E. ROGAN
*Director of the United States Patent and Trademark Office*